March 29, 1966 F. G. THOMPSON 3,242,614
MUSHROOM GROWING ARRANGEMENT
Filed Dec. 9, 1963
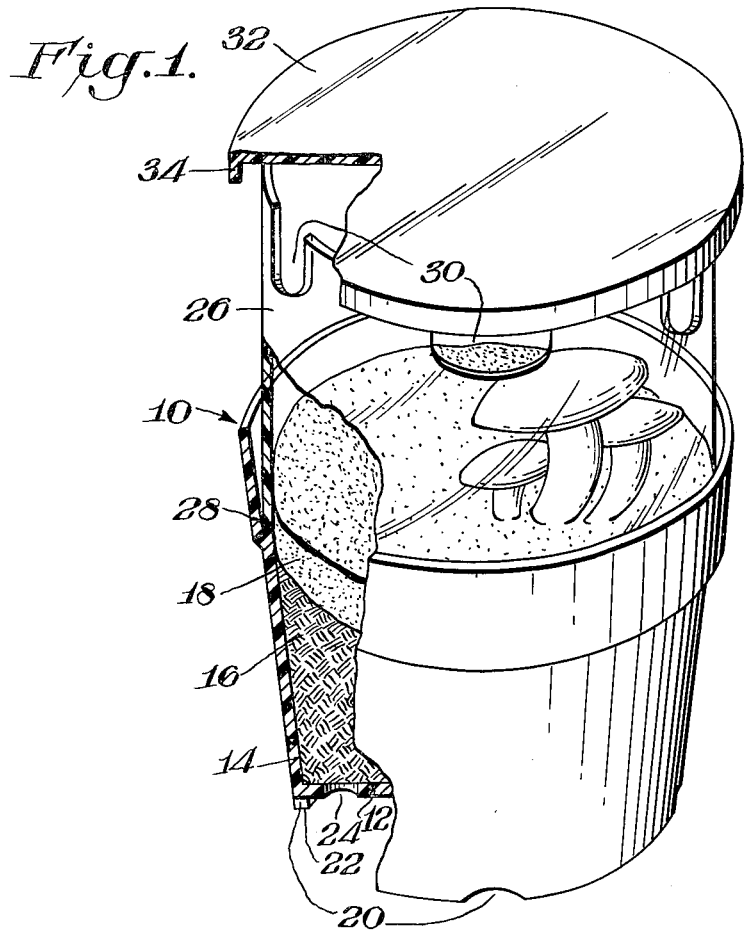
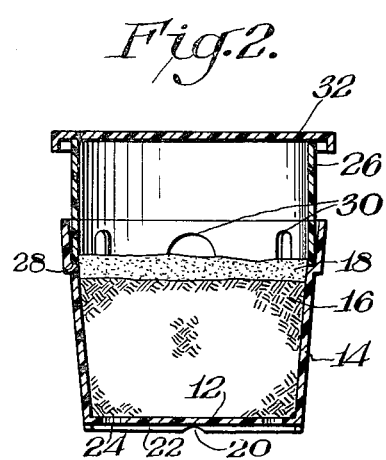
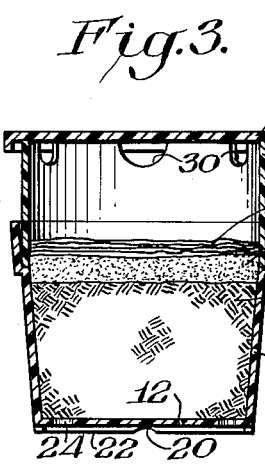
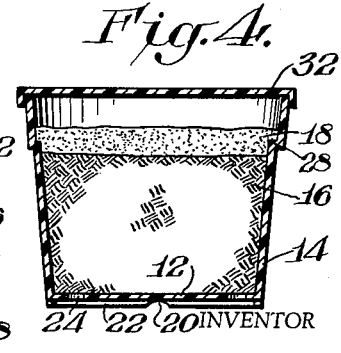
INVENTOR
Forrest G. Thompson
BY Connolly and Hutz
ATTORNEYS

United States Patent Office 3,242,614
Patented Mar. 29, 1966

3,242,614
MUSHROOM GROWING ARRANGEMENT
Forrest G. Thompson, Landenberg, Pa., assignor to Mushroom Supply Co., a corporation of Pennsylvania
Filed Dec. 9, 1963, Ser. No. 328,859
1 Claim. (Cl. 47—1.1)

This invention relates to an arrangement for cultivating mushrooms and the like from mycelium in small quantities, and more particularly to equipment for raising mushrooms under conditions markedly different from the environment long considered mandatory for successful growth by commercial mushroom growers.

Prior to the present invention, mushrooms have been cultivated with success primarily in underground caves or mines, or in large, expensive mushroom growing houses wherein critical environmental characteristics can be carefully controlled to suit the notoriously temperamental and difficult crop. Conditions such as light, temperature, humidity, ventilation and the like are carefully maintained by experienced professional growers at different critical balances during successive portions of the mushroom growing cycle. Previous attempts to grow mushrooms inexpensively in very small quantities outside of laboratories, on the other hand, have heretofore been singularly unsuccessful.

This invention is based on discoveries that certain of the traditional light and temperature requirements may be relaxed if greater control of other requirements is exercised. For instance, moisture retention in the growing media may be improved by the presence of humid air adjacent the media, and humidity may in turn be controlled by ventilation and irrigation as well as by temperature and the like. The mushroom growing arrangement of this invention developed in accordance with such discovery permits successful mushroom raising by hobbyists or students under environmental conditions commonly found in average living quarters such as homes, schools, or the like.

Accordingly, it is an object of the present invention to provide an arrangement for growing small quantities of mushrooms wherein substituted environmental growing conditions different from those utilized in commercial mushroom growing processes are utilized.

Another object of the present invention is to provide an arrangement for growing small quantities of mushrooms wherein novel container means operates in cooperation with prepared growing media to produce mushrooms under conditions heretofore considered adverse for successful mushroom raising.

The general arrangement of this invention is based on the requirement that part of the growing media from which mushrooms are raised is developed only in large quantities. For instance, composting piles of several tons of material are considered minimal for successful preparation and decomposition for media in which mushroom spawn can develop.

Thus, the arrangement of this invention comprises a kit for growing small quantities of mushrooms having food value, primarily in homes or schools or the like, which is capable of being shipped with the already developed growing media included. The growing media comprises two varieties which are supplied separately. Spawn media such as compost in which mushroom spawn or mycelium has been run may be supplied already in a container ready for use. Casing media may be supplied in a separate moisture resistant container, such as a plastic bag, so as to be isolated from the spawn media until the growing process is to begin. The composition of the growing media per se forms no part of the present invention, and will not be described in detail.

A container is provided which controls the growing environment to enable small quantities of mushrooms to be grown in the relatively warm, bright environments found in human living quarters. The container defines a growing chamber for mushrooms and includes a lower surrounding side wall for holding the bed of spawn media with a generally level layer of casing media directly on the bed of spawn media. Apertures provide ventilation to the lower regions of the spawn media bed. Upper surrounding side walls extend vertically above the casing media layer to a distance at least as high as the full grown height of mushrooms. Because of the use of the arrangement of this invention as a novelty, curiosity or educational aid, at least the upper surrounding side walls are advisably of a transparent material to permit constant observation of growing mushrooms. A top wall spanning the upper portions of the side wall is provided to complete the growing chamber enclosure so that humidity and ventilation conditions may be controlled in accordance with the principles of this invention. Finally, means are provided which are shiftable to generally preclude or materially limit ventilation to the top of the casing media layer during the first portion of the mushroom growing cycle, and to permit controlled circulation in certain zones during the second portion of the cycle. The controlled circulation in the latter portion is, in accordance with the invention, at a level at least as high as the anticipated height of full grown mushrooms.

Generally, the casing media is removed from its separate, moisture-proof container at the time the growing process is to start. It is moistened with a predetermined percentage of tap or other water and mixed therewith according to procedures which will not damage the carefully prepared media. The casing media is then applied directly on top of the bed of spawn media supplied already in the bottom of the growing chamber. Thereafter, the entire assembly rests for a period of time such as ten days or so with a minimum of ventilation to the surface of the casing media except briefly for periodic irrigations. At the specified time in the mushroom growing cycle when mycelium has entered the casing yet prior to the appearance of small mushrooms or "pinheads," the container means is shifted to permit controlled circulation in the growing chamber at a level at least as high as the anticipated height of full grown mushrooms. Thereafter, for the remainder of the mushroom growing cycle, the container is opened only briefly to permit access to the growing chamber for periodic irrigations, and of course for harvesting the several flushes of ripened mushrooms.

The container defining a growing chamber for mushrooms creates the desired environmental conditions for growing small quantities of mushrooms according to the above discussion. Several possible embodiments of such container means are contemplated, and the following embodiments are illustrative only, and not exclusive suggestions of apparatus for defining a suitable growing chamber.

Other objects and advantages of the present invention will become apparent to one skilled in the art from a reading of the following description in conjunction with the accompanying drawings wherein similar reference characters refer to similar parts, and in which:

FIG. 1 is a perspective view with parts broken away showing one form of the mushroom growing arrangement of this invention;

FIG. 2 is a sectional elevational view of the arrangement of FIG. 1 showing a first manner of controlling ventilation;

FIG. 3 is a sectional elevational view of the arrangement of FIG. 1 showing a second manner of controlling ventilation; and FIG. 4 is a sectional elevational view of the arrangement of FIG. 1 showing a third manner of controlling ventilation.

In FIG. 1 the container means 10 comprises a generally horizontal circular bottom wall 12, and a lower surrounding side wall 14 upstandingly connected to the bottom wall 12 in cup-like fashion for holding growing media such as a bed 16 of mushroom spawn media with a generally level layer 18 of casing media thereon. Apertures, such as scalloped openings 20 in a lower depending rim 22 of the cup-shaped container and holes 24 through the bottom wall 12, provide ventilation to the lower regions of the spawn media bed 16. An upper surrounding side wall 26 taking the form of an open ended cylinder extends generally vertically above the casing media layer to a height at least as high as the anticipated full grown height of mushrooms. An inner annular shoulder 28 near the upper portion of the lower wall 14 is provided to support the cylindrical upper wall 26. A plurality of scalloped cut-out portions 30 around one end of the cylindrical wall 26 are provided for controlling ventilation, as described below. A top wall or lid 32 including a narrow depending flanged rim 34 is provided for spanning the upper portion of the side wall. The growing chamber container according to this invention may be constructed of opaque, translucent or transparent material. In the FIG. 1 embodiment, the bottom wall 12 and lower side wall 14 are of an opaque material, the upper side wall 26 is of a transparent material, and the top wall 32 is of a translucent material.

With the arrangement illustrated in FIG. 1, there are several manners of precluding or limiting ventilation to the casing media during the first portion of the mushroom growing cycle. In FIG. 2, the transparent upper side wall cylinder is placed on the shoulder 28 with the end having the scalloped openings 30 turned down. The upper portion of the lower wall 14 above the shoulder 28 precludes circulation through the scalloped openings 30 which are of a height less than the height of the wall 14 above the shoulder. The lid or top wall 32 placed on the unscalloped end of the cylindrical upper wall 26 precludes circulation of air to the casing media 18. When the point is reached in the mushroom growing cycle when controlled ventilation is required in the upper portion of the growing chamber, the cylindrical transparent wall 26 is shifted to the inverted position so that the openings 30 are located upwardly where they will not be covered by the narrow flange of the lid 32.

In FIG. 3, a manner of precluding or limiting ventilation to the casing media utilizes additional means such as a covering 36 which is shifted into position directly on top of the layer 18 of casing media to preclude ventilation. Such a covering 36 may take the form of the flexible, moisture resistant, plastic container in which the casing media is originally packaged. When the point is reached in the mushroom growing cycle when ventilation is required in the upper portion of the growing chamber, the covering 36 is removed.

In FIG. 4, yet another manner in which ventilation to the casing media is precluded or limited during the first portion of the growing cycle involves placing the lid or top wall 32 directly on the upper portion of the lower side wall 14 whereby ventilation will be precluded. Later, when the point in the mushroom growing cycle is reached when circulation in the upper portion of the growing chamber is required, the cylindrical transparent wall 26 is shifted into a sandwiched position between the shoulder 28 and the top wall 32 with the scalloped end at the top.

Each of the above described embodiments cooperates with the specially prepared growing media to produce mushrooms in small quantities under adverse conditions as long as certain relationships are maintained. For instance, the lower surrounding side walls of each embodiment are designed to hold a bed of spawn media no less than three inches nor more than ten inches deep, and preferably four inches to six inches deep. The layer of casing media which overlies the bed of spawn media is advisably no more than two inches deep, and preferably approximately one inch deep. The diameters of the cup-shaped lower surrounding side wall portions of the container 10 approximately six inches to eight inches. Such containers are significantly smaller than commercial mushroom growing beds which may have an optimum length of many feet, and are suitable for growing small quantities of mushrooms in homes or schools. The upper surrounding side walls extend generally vertically above the casing media layer a distance between three inches and eight inches so as to be higher than the anticipated full grown height of mushrooms. Additionally, in each instance, the means to permit controlled circulation in the growing chamber is at a level at least three inches above the casing media layer and no more than two inches below the top wall so as to be above the anticipated height of full grown mushrooms. Finally, the aperture means in the lower portion of the container, while not extensive enough to permit significant leakage of spawn media from the container, are adequate to provide ventilation especially to the lower regions of the spawn media bed.

Under the conditions established by such container means it has been found possible to raise mushrooms in small quantities with proper irrigation under light and temperature conditions generally considered adverse. For instance, instead of the 54°–60° F. ordinarily considered desirable in commercial mushroom growing establishments, mushrooms may be grown according to this invention in temperatures ranging considerably above the 72° F. found in average living quarters. Additionally, instead of the relatively dark conditions ordinarily considered desirable in commercial mushroom growing establishments, mushrooms may be grown according to this invention in the brightness of average living quarters as long as prolonged direct rays of sunlight are avoided. Thus, with the equipment of this invention, mushrooms may be grown under conditions heretofore considered adverse.

Consequently, a mushroom growing arrangement has been disclosed which enables those unskilled in the art of growing mushrooms to raise small crops thereof with a high measure of success. Moreover, this may be accomplished in relatively warm, bright environments customarily associated with average living quarters and long considered unsuited to mushroom culture. The container defining the mushroom growing chamber of this invention creates a particular growing environment inexpensively and in a manner which permits continuous observation of the growing process. The upper side wall also serves as a splash retarder during spray irrigations to prevent soiling of the areas surrounding the container means. Finally, the container is proportioned to minimize the possibility that amateurs or novices would misuse the arrangement of this invention and thus obtain a less than satisfactory crop.

While the above described embodiments constitute a preferred mode of practicing this invention, other embodiments and equivalents may be resorted to within the scope of the actual invention.

What is claimed is:

An arrangement for growing small quantities of edible mushrooms in comparatively warm, bright environments comprising container means defining a controlled atmosphere growing chamber for mushrooms including a lower surrounding side wall means for holding a bed of mushroom spawn media at least three inches deep with a generally horizontal layer of casing media no more than two inches deep thereon, aperture means in the lower portion of the container means to provide communication with the atmosphere exterior of the container means to ventilate the lower regions of the spawn media bed, transparent upper surrounding side wall means including an open ended tubular member removably positionable with respect to the lower side wall means to extend vertically above the casing media layer a distance between three inches and eight inches so as to be higher than the anticipated full grown height of mushrooms, the tubular member including a plurality of openings spaced therearound within two inches of one end thereof to permit controlled, transverse circulation in the growing chamber during one portion of the mushroom growing cycle at a level above the anticipated height of mushrooms, top wall means for spanning the upper portion of the side wall means including a substantially flat member removably positionable across the upper end of the tubular member above the openings, the top wall means being removable from the upper surrounding side wall means during irrigation of the casing media layer with the upper side wall means serving as a splash retarder, the top wall means and the upper side wall means both being removable from the lower surrounding side wall means during harvesting of mushrooms, the tubular member being invertible to be associated between the lower surrounding side wall means and the top wall means in two ways, one of which permits the controlled, transverse circulation in the growing chamber during one portion of the mushroom growing cycle and the other of which causes cooperation between the tubular member and the lower side wall means to substantially cover the openings and generally preclude ventilation to the casing media during another portion of the mushroom growing cycle.

References Cited by the Examiner
UNITED STATES PATENTS

| | | | |
|---|---|---|---|
| 1,783,007 | 11/1930 | Alland | 47—38.7 |
| 2,138,188 | 11/1938 | Morley | 47—34.1 |
| 2,300,776 | 11/1942 | Collins | 47—38.7 |
| 2,711,053 | 6/1955 | Dettmers | 43—34 X |
| 2,720,725 | 10/1955 | Peerless. | |
| 2,810,234 | 10/1957 | Blackburn et al. | 47—34.1 |
| 2,950,567 | 8/1960 | Newman | 47—34.1 |
| 3,106,801 | 10/1963 | Risacher | 47—37 |

ANTONIO F. GUIDA, *Acting Primary Examiner.*

T. GRAHAM CRAVER, *Examiner.*

A. G. STONE, J. R. OAKS, *Assistant Examiners.*